ically identical and interchangeable and include reference numerals (220, 420) which are positioned at an incline (or acute angle) of approximately 45 degrees with respect to the length of the scales and the arm movement. Lead lines (230, 430) having a similarly angled or inclined portion extend from adjacent each reference numeral toward a measurement division indicator (measurement indicia) (210, 410).

United States Patent [19]
Alice et al.

[11] 4,266,345
[45] May 12, 1981

[54] MEASUREMENT INDICATORS FOR A MEASURING MACHINE

[75] Inventors: Martin B. Alice, Englewood; John W. Grass, Middletown, both of Ohio

[73] Assignee: The Bendix Corporation, Southfield, Mich.

[21] Appl. No.: 153,498

[22] Filed: May 27, 1980

[51] Int. Cl.³ .......................... G01B 5/20; G01B 3/02
[52] U.S. Cl. ................................ 33/169 R; 33/1 M; 33/494
[58] Field of Search .................... 33/169 R, 494, 1 M, 33/143 M, 432

[56] References Cited

U.S. PATENT DOCUMENTS

| | | | |
|---|---|---|---|
| 2,389,369 | 11/1945 | Kittleson | 33/494 |
| 3,069,778 | 12/1962 | Schiler | 33/169 R |
| 4,159,571 | 7/1979 | Jervis, Jr. | 33/432 |

FOREIGN PATENT DOCUMENTS 273116  1/1951  Switzerland ................ 33/494

Primary Examiner—Willis Little
Attorney, Agent, or Firm—Kenneth A. Seaman; Howard G. Massung

[57] ABSTRACT

A measuring machine (100) having a movable horizontal arm (130) and a vertical column (120) for mounting a probe (140) with respect to a table (110), the arm and column each including means for measuring relative displacement of the arm. The measuring means for the arm or column includes a scale (200, 400) and a vernier (300, 500) (one fixed and one movable with the arm or column), wherein the scales for the horizontal arm and the vertical column are substant 2 Claims, 4 Drawing Figures

MEASUREMENT INDICATORS FOR A MEASURING MACHINE

BACKGROUND OF THE INVENTION

The present invention relates to either measuring machines or layout machines in which horizontal and vertical measurements are necessary.

Such machines may be of the type shown in U.S. Pat. No. 3,129,512 or 3,379,077. A machine operator positioned adjacent the machine advantageously reads horizontal and vertical measurements from a single location preferably quickly and with a minimum possibility for error. From a single operator's vantage point the reference numerals must be easily read and clearly understood (which reference numerals correspond to which of the measurement indicia) for quick and accurate machine use.

In the past, such machines have used at least two different sets of scales and verniers, one in which the height of reference numerals are arranged perpendicular to the lead lines for a vertically-extending scale and one in which the height of reference numerals are generaly aligned with the lead lines for a horizontally-extending scale. Since such a system requires at least two different sets of scales (and verniers) for the two different axes of measurement, it is undesireable in that it requires a stocking of a plurality of parts, each of which has to be separately manufactured and inventoried. In some machines, a third type of vernier and scale are required to read a third direction (depth).

The presence of similar-appearing scales for different applications (axes) presents a possibility for mismounting the scales and verniers (i.e., an x-axis scale mounted on a y-axis, etc.). In prior art machines, a mismounting of scales of this type would make readings substantially more difficult for the operator.

Since the measurement and layout machines of the present invention are manufactured in a variety of sizes, and since each different size of machine might require a different size of scale, a system which requires multiple (two or more) sets of scales for each machine (i.e., different scales for each axis) is significantly less desirable than a system which requires one.

Some prior art measuring devices such as protractors have used reference numerals which are inclined or canted. This is either to present a stylized version of numbers or in which the reference numerals have a arrangement which varies throughout a curved scale to provide a common orientation of the numerals carried on a single measuring device. In such devices, there is generally only one location of a measuring scale. The prior art is not known to have provided interchangabile scales. Examples of prior art patents which were identified in a search on the present invention include U.S. Pat. Nos. 2,701,417; 3,116,556; 3,328,883; 3,531,865; and 4,159,571.

Accordingly, the foregoing prior art systems lack a universal measurement scale (or vernier) of the type which could be conveniently mounted in either a horizontal or vertical orientation or arrangement and yet be easily read by an operator. The prior art systems also lack interchangable measurement scales suitable for mounting in either a horizontal or vertical arrangement.

SUMMARY OF THE INVENTION

The foregoing limitations and disadvantages of the prior art are overcome by the present invention which is a coordinate measuring machine having substantially identical measurement scales mounted in horizontal and vertical arrangements, the measuring scales including reference numerals which are inclined (by approximately 45 degrees from the length of the measurement scales, with an inclined lead line of approximately the same orientation extending between the reference numeral and a measurement division line or measurement indicia which is substantially perpendicular to the measurement scale.

The present invention has the advantage that such a scale may be mounted in either a horizontal or vertical configuration and yet be easily read by an operator.

The present invention also has the advantage that a measuring machine having horizontal and vertical scales requires only one set of two substantially identical scales, rather than two or three diverse sets of scales.

The present invention, by providing only one type of scale, precludes a mismounting of scales on the wrong axis.

The present invention also has the advantageous effect that the scales for horizontal and vertical use are interchangable.

Other objects and advantages of the present invention will be apparant to one skilled in the art in view of the appended drawings and the following detailed description thereof and claims.

DETAILED DESCRIPTION OF THE DRAWINGS

Figure 1:
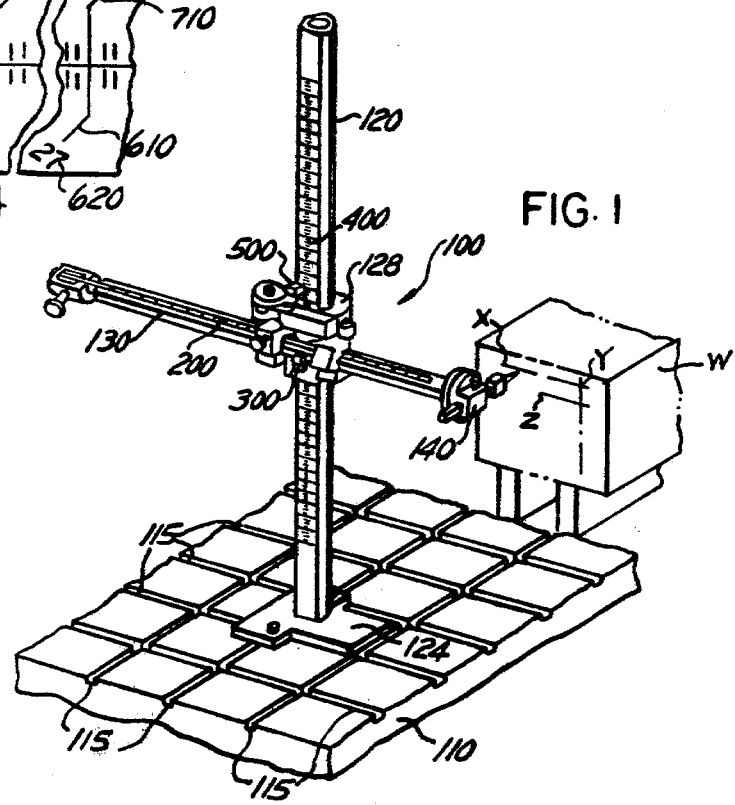
FIG. 1 is a perspective view of a measurement or layout machine of the present invention.

FIG. 1 is a perspective view of a measurement or layout machine 100 of the present invention. The measuring machine 100 is associated with a table 110 and includes a vertical column 120, a horizontal arm 130 and a probe 140. The vertical column 120 is coupled to the table 110 at a column base 124 and carries a horizontal arm mounting bracket 128 for carrying the horizontal arm 130 in a movable arrangement.

As shown in FIG. 1, the vertical column 120 extends generally perpendicular to the table 110 and the horizontal arm 130 is carried perpendicular to the vertical column 120. In such a system, both the vertical column 120 and the horizontal arm 130 include measurement scales 200,400 mounted thereon and verniers 300,500 associated therewith, respectively, to effect a measurement. A measurement is made by reading the scale 200 adjacent the vernier 300.

The machine 100 of the present invention might be a layout machine of the type described in U.S. Pat. No. 3,129,512 or a measurement machine of the type described in U.S. Pat. No. 3,279,077, both of which patents are hereby specifically incorporated by reference, as providing an environment or background for the present invention. Since the two machines do not vary significantly in operation insofar as the present invention is concerned, the machines will not be described in great detail herein.

In a layout machine, the operator positions the probe 140 to a predetermined position, at which he will use the probe 140 to inscribe or mark a workpiece W mounted on the table 110 with an indication of that measurement (i.e., a location for a machining operation, such as drilling a hole). In a measuring machine, the operator uses the machine 100 to determine the position of an existing feature (e.g., a hole) on the workpiece W. Thus, while the operation and relative accuracy requirement of the two machines differs in theory, it is substantially identical in that a relatively precise and accurate location information of the probe position is desired in a minimum amount of time. It is also desirable that the operator quickly and conveniently determine such a position without likelihood of an operator error through misreading of the scales. In this regard, the pair of scales and verniers are provided, one for each of the horizontal and vertical directions.

Scales and verniers have been known for many years and there are many well known and accurate methods of making scales and verrniers to have spaced measurement divisions generally extending perpendicular to the length of the scale or vernier, respectively. The making of such scales is not particularly relevant to the present invention, so no detailed explanation of the scale and vernier measurement divisions itself is necessary.

Figure 2:
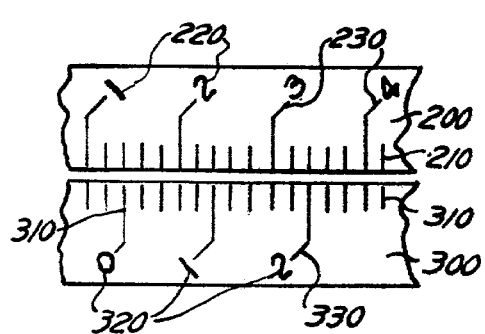
FIG. 2 is a view of an improved scale and vernier arrangement contemplated by the present invention in its horizontal orientation.

FIG. 2 is a view showing the scale 200 and the vernier 300 associated with the horizontal arm 130. Both are manufactured to have measurement divisions or indicia lines 210,310, respectively, inscribed thereon at accurately spaced location along the length of the respective scale or vernier. The measurement indicia lines 210,310 in the preferred embodiment shown here extend perpendicular to the length of the scale 200 and the vernier 300, respectively.

Reference numerals 220,320 are also inscribed on the scale and/or verniers and extend at an inclined or acute angle with respect to the length of the scale or vernier, with the acute angle being approximately 45 degrees. Associating the inclined reference numerals 220,320 to the measurement indicia 210,310 are inclined lead lines 230,330. These inclined lead lines 220,330 are also canted or inclined at an acute angle, preferably at an angle similar to that of the numerals of approximately 45 degrees in the preferred embodiment shown in FIG. 2. While the lead lines 230,330 may not be absolutely required, such lines aid in making easy and quick readings of the measurement on the scale and vernier and assist in reducing the possibility of operator error from misreading. Advantageously, each of said lead lines and reference numerals is inclined by a common angle, which angle does not vary along the length of the scale.

Figure 3:
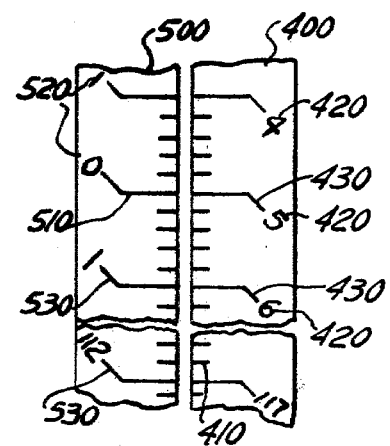
FIG. 3 is a view of the scale and vernier of the type shown in FIG. 2, but mounted in a vertical orientation.

FIG. 3 shows a vertical mounting of the scale 400 and the vernier 500 which may be identical (or substantially identical) with the scale 200 and the vernier 300 of FIG. 2. As in FIG. 2, corresponding measurement indicia lines 410,510, reference numerals 420,520 and lead lines 430,530 are shown, with inclined reference numerals and lead lines.

Figure 4:
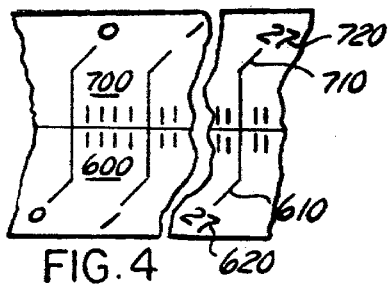
FIG. 4 is a view of an alternate scale and vernier to the scale and vernier of FIG. 2.

FIG. 4 shows an alternate scale 600 and an alternate vernier 700 with measurement reference numerals 620, 720 extending along a line perpendicular to respective lead lines 610, 710. This is in contrast to FIG. 2, where the numerals extend parallel to the lead lines.

It should be noted that the relative position of a scale with respect to a vernier is primarily a matter of design choice. In FIG. 2, the scale 200 is above the vernier 300, while in FIG. 4, the scale 600 is below the vernier 700. Likewise, the scale may be the right or left of the vernier in a system as a matter of choice.

While a preferred embodiment of the present invention has been described with some particularity, it will be apparent to those skilled in the art that many modifications of the present invention are possible without departing from the spirit of the present invention. Additionally, some of the features of the present invention may be used without corresponding use of other features. For example, it has been disclosed that the use of inclined lead lines is desireable although not absolutely necessary. Accordingly, the foregoing description should be considered merely as illustrative of the present invention and not in limitation thereof, the scope of which invention is described solely by the following claims.

Having thus described the invention, what is claimed is:

1. A measuring apparatus comprising: a base; a probe; a horizontal and vertical members, with said horizontal and vertical members movably coupled together and mounting said probe to said base while allowing movement of the probe in horizontal and vertical directions; and measurement scales mounted on each of said members, each scale including spaced measurement divisions along its length and means associated with said scale for indicating a measurement, the improvement wherein:

the two measurement scales are substantially identical in their measurement indicia including a plurality of reference numerals associated with respective measurement divisions, said reference numerals being positioned at an acute angle of approximately 45° with respect to the length of said scale.

2. A measurement apparatus of the type described in claim 1 wherein the acute angle of said lead lines is substantially equal to the acute angle of said reference numerals.

* * * * *